Nov. 16, 1937.        L. L. VAYDA ET AL        2,099,548
APPARATUS FOR TESTING GASES
Filed Dec. 4, 1936        2 Sheets—Sheet 1

INVENTORS.
LOUIS L. VAYDA AND
RAYMOND H. ROSSOMME
BY James C. Bradley
ATTORNEY

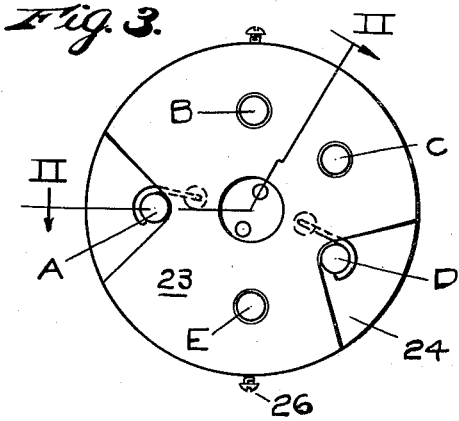
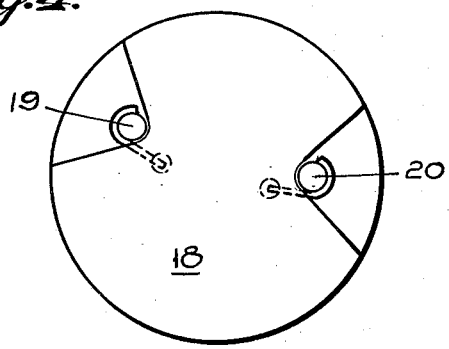
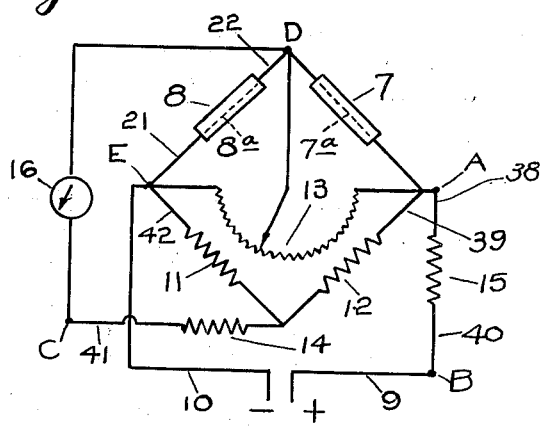
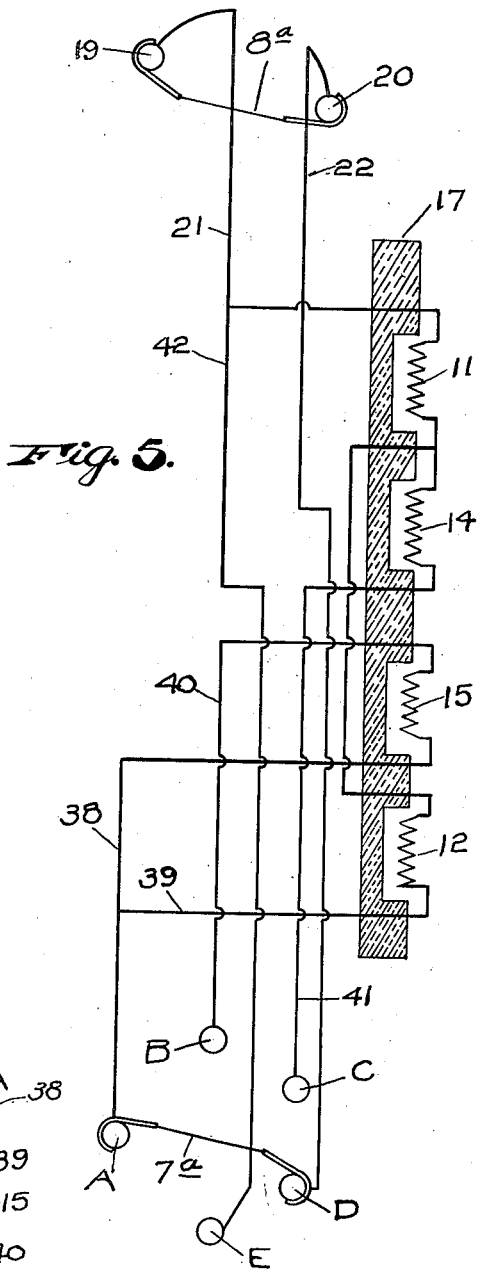

Patented Nov. 16, 1937

2,099,548

UNITED STATES PATENT OFFICE 2,099,548

APPARATUS FOR TESTING GASES

Louis L. Vayda, Aspinwall, and Raymond H. Rossomme, Wilkinsburg, Pa., assignors to Bacharach Industrial Instrument Company, a corporation of Pennsylvania Application December 4, 1936, Serial No. 114,208

3 Claims. (Cl. 23—255)

Figure 1:
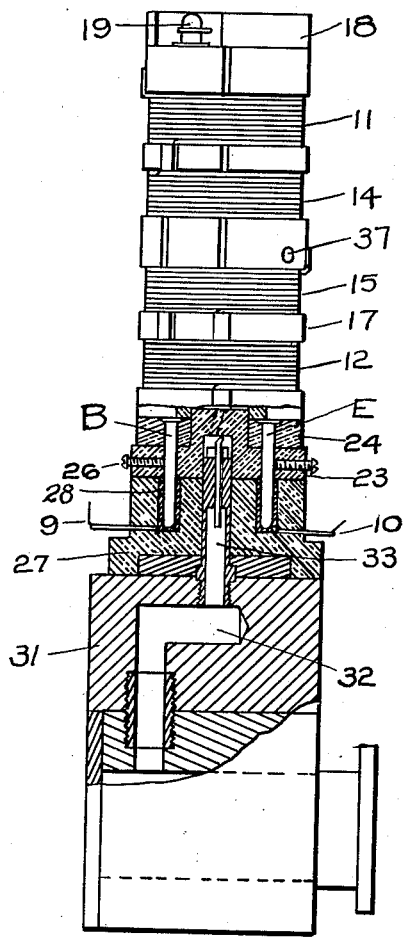
Figure 2:
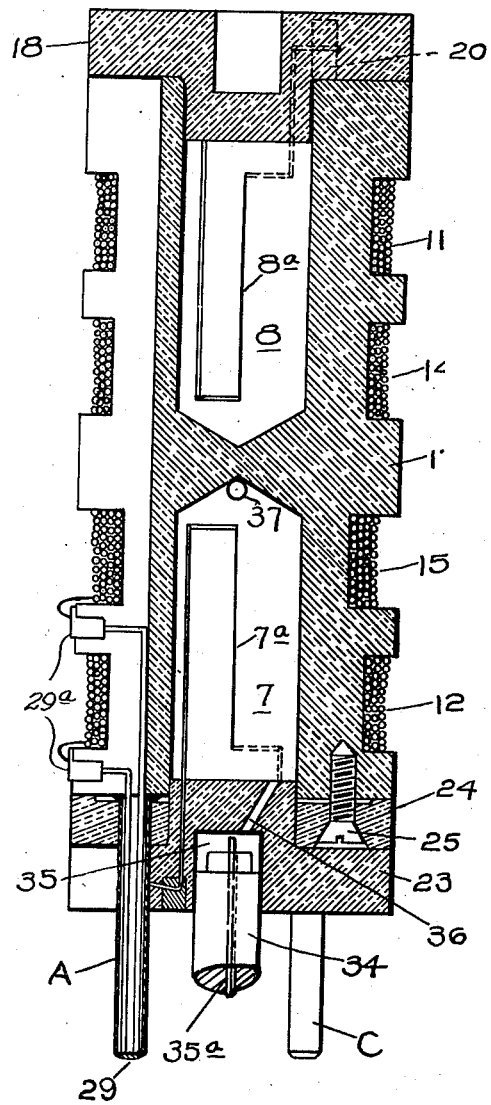

The invention relates to apparatus for testing or analyzing gases of the type shown in the patent to J. A. Stein No. 1,940,513, dated December 19, 1933, wherein the temperature of a catalyzing wire, as affected by a gas burned adjacent thereto, is used as the determining factor in ascertaining the percentage of combustible in the gas tested. This type of testing device employs a Wheatstone bridge measuring circuit, and requires the use of a plurality of resistance coils and a pair of chambers, one of which carries the catalyzing wire and the other of which carries a comparison wire. The principal object of the present invention is the provision of a very simple compact unit embodying the pair of chambers (with their contained wires) and the resistance coils required, so mounted and arranged that it may be attached to and removed from the system without effort or loss of time, and which permits the ready and convenient replacement of the catalyzing wire. To this end, the various resistances are wound on a spool which is hollowed out to provide the pair of chambers carrying the analyzing and comparison wires, and the base of such spool is provided with a plurality of pins connected to the various coils and wires mounted on or in the spool, so that when the pins are plugged into a suitable socket base, the proper electrical connections are secured between such coils and wires and the balance of the measuring system, and the analyzing chamber is connected to the line through which the gas to be tested is supplied. One embodiment of the invention is illustrated in the accompanying drawings, wherein:

Figure 1 is a side elevation partly in section of the spool and the base into which its pins are plugged. Fig. 2 is a section on the line II—II of Fig. 3. Figs. 3 and 4 are plan views of the bottom and top respectively of the spool. Fig. 5 is a diagrammatic view showing the wiring connections on the spool. And Fig. 6 is a wiring diagram of the complete testing device.

Referring first to the wiring diagram of Fig. 6, which corresponds to that of the Stein patent heretofore referred to, 7 is the gas analyzing chamber in which is mounted the resistance element 7a (Fig. 2) of platinum alloy or other material which acts as a catalytic agent in the operation of the device, and 8 is the comparison chamber in which is mounted a resistance element 8a preferably of the same material as the element 7a and having the same resistance. The Wheatstone bridge electric circuit includes the supply leads 9 and 10; the fixed resistances 11, 12; the rheostat 13, the calibration and series resistance coils 14 and 15, and the indicator 16, these elements together making up an apparatus well known in the art. The indicator 16 is calibrated directly in terms of combustible to be determined, and measures the change in potential across the Wheatstone bridge caused by variations in the temperature of the platinum alloy wire 7a (forming one leg of the bridge), the temperature and conductivity of which is varied by burning combustible gas along its length.

The chambers 7 and 8 are located in the spool or cylinder 17 of insulating material, such as Bakelite. The upper end of the spool is provided with a cap 18 of insulating material, and carries the comparison element 8a whose ends are connected to the metal posts 19 and 20, such posts being in turn connected to the wires 21 and 22.

The lower end of the spool is provided with a disc 23 of insulating material and carries the catalytic element 7a whose ends are connected to the plug-in pins A and D secured in a Bakelite disc 24. This disc 24 is secured to the end of the spool by a pair of screws 25, only one of which is shown in Fig. 2. The discs 23 and 24 together constitute a cap for the lower end of the spool. The disc 24 also carries three other plug-in posts B, C and E, whose locations are shown in Figs. 3, 5, and 6. The disc 23 is held in position by a pair of set screws 26, 26 (Fig. 1) which engage the pins B and E. The pins are preferably tubular, as indicated in Fig. 2, and the wire or wires which are connected thereto extend down through the pins and are secured to pieces of solder 29 which act as closures for the ends of the pins. The pieces of solder 29a, 29a (Fig. 2) constitute the joinders between the coils 12 and 15 and the wires leading to the pin A.

The spool is, in service, seated upon a socket member or support 27 of insulating material which is provided with a plurality of sockets in the form of metal inserts 28 (Fig. 1) to receive the pins A to E, such inserts having electrical connection with the lead-in wires 9 and 10 and the parts of the circuit between which connections are required in accordance with the wiring diagrams. The socket member or support is secured upon a base member 31 provided with a passage 32, through which the gas to be tested is supplied. A bushing 33 leads upward from the passage 32, and has at its upper end an apertured plug 34 (Fig. 2) adapted to telescope into a socket 35 located centrally of the cap 23. The aperture through the plug is partially closed by a pin 35a, thus providing an orifice (well known in the art) which is readily subject to variation as to capacity to meet requirements. A passage 36 (Fig. 2) leads into the chamber 7 from the space 35 into which the orifice discharges. Gas is discharged to the atmosphere from the chamber 7 through the outlet perforation 37 leading through the wall of the spool.

The exterior of the spool is grooved to provide the recesses into which the resistance coils 11, 14, 15, and 12 are wound, as indicated in Fig. 2. These coils are connected to the various plug-in pins by the wires 38, 39, 40, 41, and 42, as indicated in Figs. 5 and 6. Current enters the wiring set up on the spool through the socket of the pin B, and leaves at the socket of the pin E, the indicator 16 and rheostat 13 being connected to the sockets of the various pins in accordance with the wiring diagram of Fig. 6, as will be readily apparent to those skilled in the art.

It will be seen that the construction involved is very simple and compact, incident to the feature of utilizing the spool to provide the chambers 7 and 8 and as a carrier for the various resistance windings. The arrangement also provides for the ready and convenient assembly of the spool and parts carried thereby with the other parts of the testing system and permits of the ready replacement of the elements 7a and 8a when this becomes necessary. Other advantages incident to the construction will be readily apparent to those skilled in the art.

The comparator chamber 8 is shown as closed to the atmosphere, and such condition should obtain when the instrument is located in an atmosphere containing vapors which would tend to burn or perhaps in some cases tend to cause an explosion, such as the plants using quantities of solvent, such as acetone, or the like. A large use of the device is in the testing of exhaust gases from automobiles, in which the instrument itself is surrounded by normal atmosphere, and under such and similar conditions, the comparator chamber need not be closed.

What we claim is:

1. In apparatus for analyzing gas which includes a Wheatstone bridge electrical circuit comprising a plurality of resistance coils, an indicator and a pair of balanced resistance wires, one of which is a catalytic agent, a spool of insulating material, upon which said resistance coils comprising legs of the bridge are wound, which is hollowed out so that the walls thereof form two separate chambers, one of which has an outlet opening and contains the catalyzing wire and the other of which contains the other member of the pair of wires, a cap at one end of the spool having an inlet passage therethrough leading to the chamber containing the catalyzing wire, and provided with a plurality of socket pins having electrical connection with said resistance coils and said wires, and a support provided with sockets for receiving said pins in electrical connection with said circuit and provided with a passage for gas to be tested registering with said inlet passage through the cap, so that the passage for the gas is connected to the inlet passage when the pins on the cap are plugged into their sockets in the support.

2. In apparatus for analyzing gas which includes a Wheatstone bridge electrical circuit comprising a plurality of resistance coils, an indicator and a pair of balanced resistance wires, one of which is a catalytic agent, a spool of insulating material, upon which said resistance coils comprising legs of the bridge are wound, which is hollowed out so that the walls thereof form two separate chambers, one of which has an outlet opening and contains the catalyzing wire and the other of which contains the other member of the pair of wires, a cap at one end of the spool, releasable therefrom and carrying the catalyzing wire and forming a closure for said chamber containing the catalyzing wire, such cap having an inlet passage therethrough leading into the chamber containing the catalyzing wire and provided with a plurality of socket pins having electrical connection with said resistance coils and said wires, and a support provided with sockets for receiving said pins in electrical connection with said circuit and provided with a passage for gas to be tested registering with said inlet passage through the cap, so that the passage for the gas is connected to the inlet passage when the pins on the cap are plugged into their sockets in the support.

3. A unit for a gas analyzing system which includes a Wheatstone bridge electrical circuit having a plurality of resistance coils, comprising a cylinder of insulating material open at the ends and provided with a wall intermediate the ends thereof dividing the interior into two chambers with the insulating material forming the walls thereof, one of said chambers having an outlet through the side wall of the cylinder, a removable closure disc for the end of such last chamber, a resistance element of catalyzing material mounted on such disc and lying in such last chamber, a second removable closure disc for the end of the other chamber, a resistance element of the same resistance as the element of catalyzing material mounted on said second closure disc and lying in such other chamber, said plurality of resistance coils being wound on the cylinder, and a member provided with a plurality of parallel socket pins secured to the cylinder and lying between the end thereof and the first closure disc, each of said pins being in electrical connection with one of said coils or resistance elements, and an inlet passage for the gas to be tested leading into the chamber carrying the resistance element of catalyzing material being provided through said first closure disc in parallel with the pins.

LOUIS L. VAYDA.
RAYMOND H. ROSSOMME.